Figure 1:
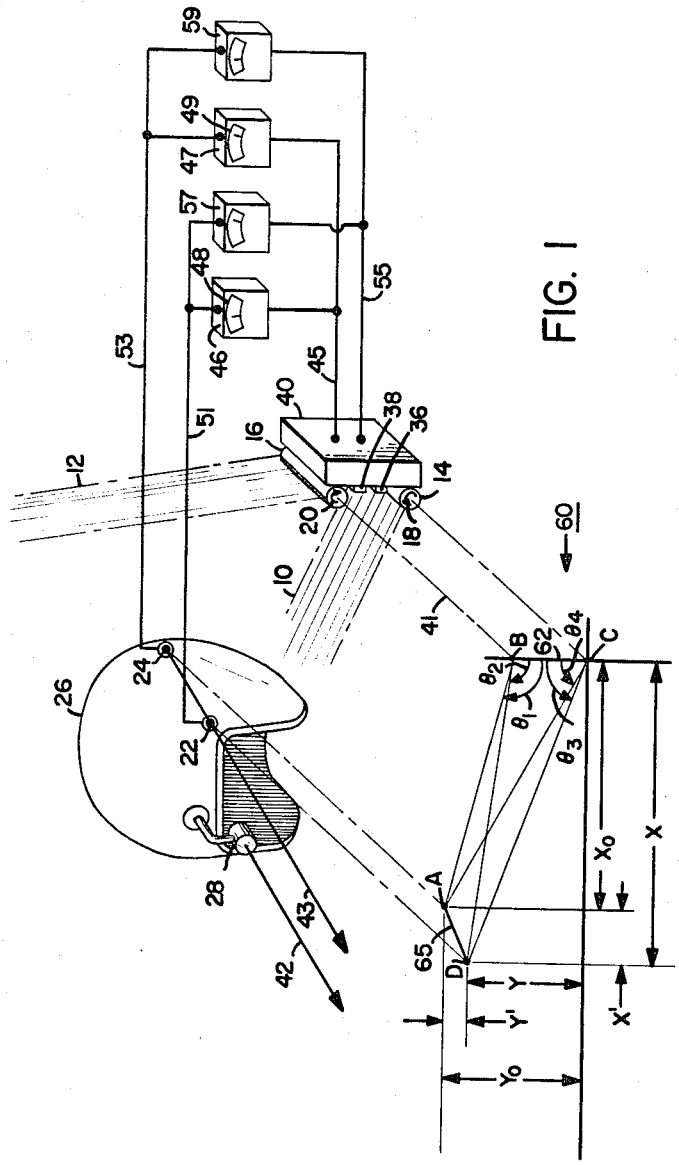

March 26, 1968 R. ABBEY ETAL 3,375,375
ORIENTATION SENSING MEANS COMPRISING PHOTODETECTORS
AND PROJECTED FANS OF LIGHT
Filed Jan. 8, 1965 2 Sheets-Sheet 1

INVENTORS
ROBERT ABBEY
DAVID S. LANE
BY Charles J. Ungemach
ATTORNEY

March 26, 1968 R. ABBEY ETAL 3,375,375
ORIENTATION SENSING MEANS COMPRISING PHOTODETECTORS
AND PROJECTED FANS OF LIGHT
Filed Jan. 8, 1965 2 Sheets-Sheet 2

INVENTORS
ROBERT ABBEY
DAVID S. LANE
BY Charles G. Ungemach
ATTORNEY

United States Patent Office 3,375,375
Patented Mar. 26, 1968

3,375,375
ORIENTATION SENSING MEANS COMPRISING PHOTODETECTORS AND PROJECTED FANS OF LIGHT
Robert Abbey and David S. Lane, Minneapolis, Minn., assignors to Honeywell Inc., a corporation of Delaware
Filed Jan. 8, 1965, Ser. No. 424,252
7 Claims. (Cl. 250—216)

The present invention relates to apparatus and methods for sensing the attitude of a remote object and more particularly to apparatus for determining an axis along which the object is pointing, traveling, or sighting. Although the invention is herein described as a system for optically measuring the line of sight of an aircraft pilot, that is, the direction in which he is looking, it should be understood that the novel techniques and apparatus disclosed may be equally well employed to determine the direction of pointing of any of a wide range of movable objects. For instance, the invention may be used to remotely monitor the direction in which a road grader is moving, the direction in which a bed-ridden hospital patient is looking, or the direction in which a rocket launcher is pointing. However, for the purposes of this application, the system will be described as it would be utilized to determine the direction in which a pilot is looking.

In order to provide aircraft pilots with more time for other duties, offset target weapons which may be fired toward targets which are not directly in line with the course of the aircraft have been developed. Usually in weapons systems of this type a computer or guidance system is used to aim or guide the missile toward a desired target. Thus, it is necessary to supply information to the computer or guidance system to indicate the exact direction of the desired target. One of the most favored ways of providing this information is to have the pilot simply look at a target and activate the direction determining system. The direction determining system then measures the position of the pilot's head, thus, determining the direction in which he is looking, and relays this information to the computer or guidance system which may then deploy suitable weapons against the target as already described. The present invention comprises just such a direction determining system which can optically measure the direction in which a pilot's head is pointing without interfering with the pilot's other activities.

Before describing my invention, a brief description of the prior art systems for accomplishing this measurement would be helpful. One of the prior art systems utilizes mechanical linkage between the pilot's helmet and the frame of the aircraft. However, this system is far too clumsy, complicated, and restraining to be practical. Another system utilizes a light source in the cockpit to reflect a beam of light from small mirrors mounted on the pilot's helmet into detectors located elsewhere in the cockpit. The position of the helmet is indicated by the angle of reflection of the light beams. This system suffers the disadvantage that the pilot is quite severely limited in the amount of freedom he has to move his head inside the cockpit before he will lose the light beam reference between his helmet and the aircraft. The present invention overcomes these objections by scanning the pilot's helmet with two fans of light from slits in two small rotating drums mounted on the cockpit walls. The only apparatus on the pilot is two small light detectors mounted on his helmet to record the passage of each fan of light. The rotating drums are constructed so as to project wide flat beams of light which have sharp and clearly defined edges. These wide fans of light will activate the two light detectors on the pilot's helmet whether he is far forward in the cockpit or far to the rear. Furthermore, two rotating drum light sources are used to provide sufficient information so that no confusion results from the pilot being on the right hand side of the cockpit or on the left hand side. Consequently, the pilot is afforded a great deal of freedom in the movement of his head which was not available in the prior art systems. Since the rotating drums rotate at a constant rate, the angle subtended by two detectors on the pilot's helmet may be measured relative to each rotating drum. Knowing the distance between the two detectors and the distance between axes of the two rotating drums, it is possible to calculate the direction of the axis which passes through both of the detectors on the pilot's helmet. If these detectors are arranged to align with the direction of line of sight of the pilot then the line of sight is known relative to the aircraft frame. In other words it may be said that the rotating fans of light establish two planes in space, the intersection of which is a line parallel to the line joining the two detectors. My invention, therefore, allows the pilot a maximum amount of freedom while still measuring the direction in which he is looking with a high degree of accuracy.

Accordingly, it is an object of the present invention to provide an attitude sensing system which is compact, accurate, and independent of translation of the object whose attitude is being determined.

Figures 2, 3:
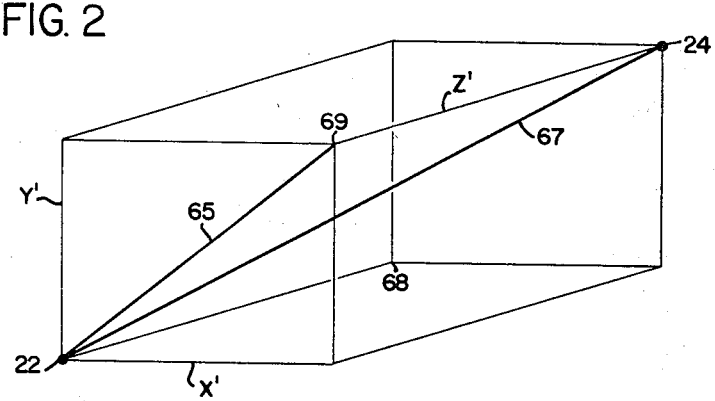

Further objects and advantages will become apparent in the following description and drawings in which:

FIGURE 1 is a schematic diagram of my invention showing the principle of operation, FIGURE 2 is a geometrical construction to demonstrate how the line of sight axis may be determined from the information supplied by the apparatus of FIGURE 1, and FIGURE 3 is a perspective cut away view of a light scanning mechanism utilized in the preferred embodiment of my invention.

In FIGURE 1 my invention is schematically shown in operation. A pair of wide flat fans of infra-red light 10 and 12 are produced by slits in a pair of rotating infra-red sources 14 and 16 respectively. Sources 14 and 16 rotate in the direction indicated by a pair of arrows 18 and 20, thus, causing light bands 10 and 12 to periodically sweep across a pair of infra-red light detectors 22 and 24 which are mounted on a pilot's crash helmet 26. Detectors 22 and 24 may be photodiodes or any other suitable light detecting element. Infra-red light is used in the preferred embodiment so as not to interfere with the pilot's normal vision, however, other forms of radiation may be used. Also attached to helmet 26 is a sight 28 whose optical axis is parallel to a line joining detectors 22 and 24. If desired the optical axis of sight 28 may not be parallel to the line joining detectors 22 and 24, but the angle between the two should be known. Another pair of infra-red detectors 36 and 38 are shown fastened along with sources 14 and 16 to a reference block 40. Reference block 40 is stationary with respect to the coordinate system which has its Y axis along the vertical direction, its Z axis along the light source axis as shown by numeral 41, and its X axis orthogonal to the Y and Z axis. Hereinafter this system will be considered the primary coordinate system.

It should be understood that the positions of the detectors and sources in FIGURE 1 are only one possible arrangement and many other configurations are workable. Generally speaking, the farther the detectors are apart and the farther the sources are apart the more accurate the system will be. The particular arrangement of parts may be optimized for the particular type of measurement anticipated. For example, the two sources may be on opposite sides of the pilot's crash helmet 26.

In operation the apparatus of FIGURE 1 works in the following way. A pilot, not shown, who would be wearing crash helmet 26, simply decides on a target, aligns sight 28 on the target, and activates the system of FIGURE 1 by means not shown. In this case sight 28 is shown aimed in the direction indicated by arrows 42 and 43 which are parallel. Arrows 42 and 43 are pointing in a direction which is, relative to the primary coordinate system, slightly to the right of the Z axis and below the Z axis so that they are not pointing along the Z axis but rather have small X and Y components. Arrow 43 is also the line connecting detectors 22 and 24 as already described. As light source 16 rotates at a constant rate, light beam 12 first strikes detector 38 which generates a timing pulse along conductor 45 to a timer 46 and a timer 47. This reference pulse causes timers 46 and 47 to begin counting time, the accumulation of which is shown by a dial 48 and a dial 49. As source 16 continues to rotate, light beam 12 sequentially activates detectors 22 and 24 on helmet 26. The timing pulses thus generated by detectors 22 and 24 are carried by a pair of conductors 51 and 53 to timers 46 and 47 causing timers 46 and 47 to stop measuring time. Since source 16 rotates at a constant rate the measurement of time indicated by timers 46 and 47 on dials 48 and 49 is directly representative of the angle of detectors 22 and 24 as measured from the vertical at reference block 40. Dials 48 and 49 may be thus marked in degrees or radians rather than in units of time. It should be understood that in applying this system to different applications in which the attitude of a quite remote object is measured conductors 51 and 53 may be replaced by corresponding radio transmitters and receivers. In this way no physical connection to the object being measured is necessary. Sources 14 and 16 are coordinated so that when source 16 has just completed its sweep of helmet 26, source 14 will be just starting its sweep. In this way no confusion between the sources is caused. Source 14 will actuate detector 36 and generate a reference plus along conductor 55 thus starting a pair of timers 57 and 59 in the same way as already described. When light beam 10 from source 14 strikes detectors 22 and 24 the timers 57 and 59 are turned off and indicate the angle of detectors 22 and 24 from the vertical as measured by source 14. Timers 46, 47, 57, and 59 are designed so that a turnoff reference timing pulse from detectors 22 and 24 does not affect them unless they have first been turned on by a timing pulse from detector 38 or 36. These timers may be constant speed electric motors actuated by relays or any other suitable mechanism to time the duration between pulses received from the reference detectors on the reference block 40 and the movable detector on the helmet 26.

To better understand the operation of the present invention reference should be had to the geometrical construction of FIGURE 1 indicated generally by the numeral 60. This construction represents the projection of the various important elements onto the XY plane so as to clearly point out the angles which are measured by timers 46, 47, 57, and 59. Point A is the projection of detector 24 onto the XY plane and point D is the projection of detector 22 onto the XY plane. Point B and C are the projections of the axes of the rotating sources 16 and 14 respectively onto the XY plane. The distance between B and C indicated by the numeral 62 is known and is the actual distance between the axes of sources 16 and 14. As source 16 rotates it measures the angle between detector 38 and detector 22 shown in the construction as the angle $\theta_2$. The angle between detector 38 and detector 24 is also measured by source 16 and is shown on the construction as the angle $\theta_1$. As source 14 rotates it measures the angle between reference detector 36 and detector 24 which is shown on the construction as the angle $\theta_4$. It also measures the angle between reference detector 36 and detector 22 shown on the drawing as $\theta_3$. The angle $\theta_2$ is indicated by timer 46 and the angle $\theta_1$ is indicated by timer 47. The angles $\theta_4$ and $\theta_3$ are indicated by timers 59 and 57 respectively. Thus, as can be seen by the construction, the four timers provide the knowledge of four angles which allows the points A and D to be known with respect to their X and Y coordinates. For instance, triangle ABC may be calculated since $\theta_1$ and $\theta_4$ are known and the length of the side 62 is known. Thus the coordinates of A, namely $X_0Y_0$ may be determined as shown on the construction 60. Since $\theta_2$ and $\theta_3$ are known along with the side 62 triangle DBC may be evaluated thus giving the XY coordinates of the point D shown in the construction as X and Y.

In order to determine the direction of pointing of arrow 43 which is the axis which passes through detectors 22 and 24 one further calculation is necessary. As can be seen in FIGURE 1 the line connecting detectors 22 and 24 is projected onto the XY plane as line segment 65. This line segment 65 may be more clearly seen in FIGURE 2. In FIGURE 2 a box is shown whose sides are parallel to the primary coordinate system axes X, Y, and Z. Detectors 22 and 24 are shown in FIGURE 2 at the diametrically opposite corners of the box and the line segment connecting detectors 22 and 24 on helmet 26 is shown in FIGURE 2 as line segment 67. Referring again momentarily to FIGURE 1 it can be seen that the difference between $Y_0$ and Y is Y' which is the difference in height between points D and A, the ends of the line segment 65. Y' is also shown in FIGURE 2 as the height of the box. Similarly in FIGURE 2 X' is shown which is the difference between X and $X_0$ in FIGURE 1. FIGURE 2, therefore, shows the line segment 67 connecting detectors 22 and 24 in its relationship to the primary coordinate system namely the sides of the box X'Y' and Z' and FIGURE 2 also shows the projection of line segment 67 onto the XY plane namely line segment 65. The length of line segment 65 is simply the square root of the sum of the squares of X' and Y'. Since the length of the line 67 is known, that is, the length between detector 22 and 24, the triangle formed in FIGURE 2 by side 65, side 67 and side Z' may be evaluated. Since FIGURE 2 is a three dimensional perspective view, the angle between side 65 and Z' does not appear to be 90° although, of course, it is. Thus, as shown in FIGURE 2, X', Y', and Z' are known therefore the angle of pointing of line segment 67 can be determined with respect to the primary coordinate system. If desired all of the calculations described herein may be performed by a suitable computer and the scanning operations which determine the angle $\theta_1$, $\theta_2$, $\theta_3$, and $\theta_4$ may be repeated any number of times so as to increase the accuracy of this system.

Since the present invention is independent of translation of the detectors along the Z axis it is possible that in FIGURE 2 the detectors 22 and 24 could be at the corners 68 and 69 respectively of the box, however, this would correspond to the pilot looking up at the target which he rarely if at all does. If desired, an additional fan of light may be utilized to avoid this ambiguity.

In summary then, the pilot, who normally would be wearing helmet 26, sights the target through eye piece 28 and activates the system. The rotating sources 16 and 14, which may rotate in any convenient direction, scan the various detectors so that the angles $\theta_1$–$\theta_4$ are indicated by the timers 46, 47, 57, and 59. These angles plus the known distance between the axes of the rotating sources 16 and 14 and the known distance between detectors 22 and 24 on the helmet provide the necessary information to calculate the direction in which the pilot is sighting. This information may then be conveyed to a guidance system which may deploy suitable weapons toward the target which the pilot sighted on.

For the sake of simplicity the light sources 14 and 16 have been described as constructed from revolving drums which have a long narrow slit in them. In reality, however, in the preferred embodiment, a more sophisticated system has been utilized which is shown in FIGURE 3. FIGURE 3 shows a container 70 which contains a set of gears 71, 72, 73, and 74 which are powered at a constant known rate by a constant speed motor 75. Gears 74 and 72 serve to rotate a pair of reflectors 76 and 77. Reflectors 76 and 77 have a reflective surface which is formed into a series of rounded steps typically indicated by the numeral 78. Each of the five curved surfaces on the rotating reflectors 76 and 77 acts as a point source which sends out light in a narrow plane, the plane rotating with the reflector. This light is provided by an infra-red point light source 79 which generates infra-red light through an infra-red lens 80 which collimates the light. The light then reflects from a mirror 84 to a mirror 85 and thence rotating reflector 77 where it is reflected by the rounded surfaces to form a plane of light. This narrow plane of light is of substantially constant thickness and scans the pilot's helmet through a window similar to window 90. Light from source 79 also reflects from a mirror 83 to a mirror 82 where it is reflected toward rotating reflector 76 and thence out window 90 in the same manner as already described with respect to rotating reflector 77. The light detectors 36 and 38 of FIGURE 1 are shown in FIGURE 3 as photodiodes 87 and 89.

It should be remembered that these reference light detectors or photodiodes are for the purpose of determining when the light fans pass a predetermined reference position. Thus, any of a variety of switches or indicators may be substituted for the light detector so as to perform this function. For instance, a cam operated switch on the revolving drum may be used.

Again it should be undesrtood that the present invention may be employed in a variety of applications where it is necessary to determine the attitude of a remote object. Many variations and modifications of this system may be made by those skilled in the art which do not differ substantially from the invention as herein claimed. For instance, the addition of more detectors to the object being monitored or the use of more rotating sources of light could allow additional information regarding the orientation of the remote object to be determined such as rotation about the roll axis. Furthermore, the detectors may be made sensitive to different types of light so as not to interfere with each other's operation thus providing a situation in which multple simultaneous scans are possible.

We claim as our invention:

1. The method of determining the orientation of a member relative to a coordinate system which comprises the steps of affixing at least two light detectors to the member a known distance apart; scanning the member with at least two planes of light at known rate; determining when the planes of light cross said detectors relative to when the planes of light are parallel to an axis of the coordinate system, and computing therefrom the position of the axis joining said detectors.

2. In a system to measure the orientation of a first member relative to a second member, in combination:
   a plurality of light detectors on the first member;
   means generating a plurality of rotating planes of light;
   means mounting said generating means stationary with respect to the second member; and
   means measuring the times of incidence of the planes of light on said detectors relative to the times when said planes of light are in a predetermining position as an indication of the relative coordinates of said detectors in space.

3. Apparatus to measure the difference in spatial orientation between two members comprising:
   a first pair of light detectors;
   a second pair of light detectors;
   means mounting said first pair of detectors on one member;
   means mounting said second pair of light detectors on the other member;
   means projecting two substantially flat planes of light;
   means rotating said projecting means so as to rotate each of the two planes of light about substantially parallel axes, said axes being stationary relative to one member; and
   means measuring the times of incidence of said planes of light on said first and second pair of detectors as an indication of the relative position of said detectors.

4. In a system to measure the orientation of a member relative to an observer;
   an observational base;
   first and second light detectors on the member;
   first and second light plane projecting means on said base;
   means scanning said first and second light projecting means across said member and said base at a known rate;
   means measuring the time of transit of said scanning means between said detectors and a reference position on said base; and
   means showing the position of said first and second detectors from times measured by said measuring means.

5. Apparatus to establish the attitude of an object relative to an observer comprising in combination:
   an observational base;
   first and second moveable light detectors, said movable detectors adapted to move with the object;
   means generating first and second substantially flat planes of light;
   means rotating one of the flat planes of light about a first axis which lies in the plane of the light;
   means rotating the other of said planes of light about a second axis lying in the other plane of light and substantially parallel to said first axis so as to scan said detectors; and
   timing means to record the time of transit of the planes of light across the detectors relative to a predetermined time and indicate the relative attitude of the detectors therefrom.

6. Apparatus to determine the direction of a man's line of sight relative to a vehicle in which he is moving comprising in combination:
   first light detecting means;
   second light detecting means;
   means mounting said first and second detecting means on a man's head so that they move therewith;
   means rotating a first planar fan of light about a first axis which is fixed to the vehicle;
   means rotating a second planar fan of light about a second axis fixed to the vehicle, said second axis being substantially parallel to said first axis;
   reference means;
   means mounting said reference means to said vehicle;
   means measuring the time of incidence of said first and second fans of light on said detecting means relative to the time when said first and second fans of light are in a predetermined position relative to the vehicle as indicated by said reference means, said measuring means indicating the position of said first and second detecting means relative to the vehicle.

7. A device to sense the orientation of a first member relative to a second member comprising:
   a plurality of mirrors disposed on first and second axes so as to reflect light, which is projected there toward substantially along the axes, in a plurality of directions, said plurality of directions forming flat constant thickness planes;

means rotating said plurality of mirrors about said axes at a constant rate so as to cause said planes to scan the first member;

a first pair of detectors affixed to the first member to record the incidence of light thereon;

a second pair of detectors affixed to the second member to record the incidence of light thereon;

means locating said plurality of mirrors proximate said second member and said second detectors; and means timing the passage of said planes between said detectors as an indication of the relative position in space of the detectors affixed to the first member.

No references cited.

RALPH G. NILSON, *Primary Examiner.*

M. A. LEAVITT, *Assistant Examiner.*